Feb. 16, 1965  W. FRIEDRICHSEN ETAL  3,169,976
PRODUCTION OF PURE MALEIC ANHYDRIDE
Filed March 7, 1962
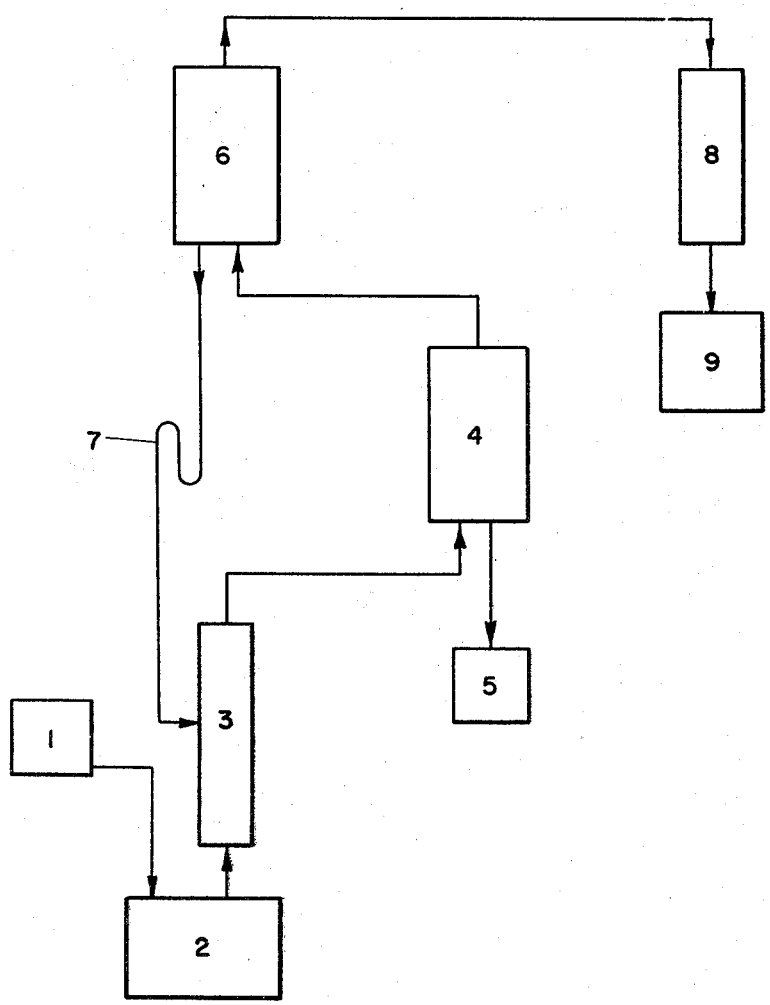
INVENTOR.
WILHELM FRIEDRICHSEN
HANS JOACHIM STEPHAN
BY
ATTORNEY

United States Patent Office 3,169,976
Patented Feb. 16, 1965

3,169,976
PRODUCTION OF PURE MALEIC ANHYDRIDE
Wilhelm Friedrichsen and Hans Joachim Stephan, both of Ludwigshafen (Rhine), Germany, assignors to Badische Anilin- & Soda-Fabrik Aktiengesellschaft, Ludwigshafen (Rhine), Rhineland-Pfalz, Germany
Filed Mar. 7, 1962, Ser. No. 178,164
Claims priority, application Germany, Mar. 7, 1961, B 61,549
4 Claims. (Cl. 260—346.8)

The present invention relates to the production of maleic anhydride by dehydration of maleic acid. More specifically, the invention relates to a simplified process for the production of maleic anhydride of high purity.

It is known that maleic acid in solid form and also as an aqueous solution can be converted, by treatment with suitable organic solvents at temperatures above 120° C., into crude maleic anhydride contaminated with fumaric acid and that pure maleic anhydride can be obtained therefrom by distillation.

It is also known that the dehydration of maleic acid to maleic anhydride may be carried out without the use of solvents by heating solid maleic acid under reduced pressure at 110° to 135° C. and expelling the water through a column, during which operation a liquid phase is maintained in the heating vessel, for example by means of maleic anhydride placed in the vessel. The crude anhydride is then purified by distillation.

It is further known that the said processes may be improved by slowly introducing the maleic acid in the form of an aqueous solution in controlled amounts into anhydride which is boiling under reduced pressure, the water being driven off at the same time. By simultaneously withdrawing the anhydride formed, the process may be made continuous, which offers the advantage that the formation of fumaric acid is considerably reduced owing to the shorter residence period of the maleic acid in the reaction vessel. Moreover, the step of recovering the maleic acid in solid form is dispensed with. In another improvement of this method, the column above the dehydration vessel is replaced by a dephlegmator which is kept at a temperature at which the water vapor does not condense, while the anhydride vapor is largely condensed. The crude anhydride is either collected in the reaction vessel or withdrawn continuously from the bottoms or from the reflux of the condenser. However, in order to recover pure maleic anhydride, i.e., maleic anhydride which is substantially free from maleic acid and fumaric acid, it is necessary also with this known method to subject the product to a further purification by distillation.

Furthermore, processes have been described in which the said distillation step is combined with the production step, in that the maleic anhydride is separated by partial condensation from the vapors containing maleic anhydride and water and supplied to the top of a column in which maleic anhydride is obtained as bottoms. Maleic anhydride obtained in this manner likewise contains such an amount of fumaric acid that the latter must be filtered off from the melt.

It is a disadvantage of all known methods that the small amounts of fumaric acid, or also of maleic acid, contained in the maleic anhydride, crystallize out and lead to obstructions and plugging in continuous equipment. Moreover, maleic anhydride prepared from maleic acid by known methods can be used for the production of polyesters only after it has been distilled again or after the fumaric acid has been filtered off from the maleic anhydride melt.

It is an object of this invention to provide a process for the production of maleic anhydride from maleic acid or aqueous solutions of maleic acid which can be carried out in a single stage and continuously and which affords pure maleic anhydride. Another object of the invention is to provide a process in which no difficulties whatever occur by reason of solid maleic acid and/or fumaric acid. A further object of the invention is to provide a process for the production of maleic anhydride in which maleic anhydride suitable for the production of polyesters is obtained direct.

These and other objects are accomplished by introducing maleic acid or an aqueous solution of maleic acid into maleic anhydride boiling under a pressure of between 50 and 760 mm. Hg, vaporizing maleic anhydride and water, cooling the vapors containing maleic anhydride and water vapor, and having a temperature of between 110° and 200° C. in a first condensation zone by only a few degrees, for example by 3° to 30° C., preferably by 5° to 20° C., but not to a temperature below 100° C., withdrawing the condensing maleic anhydride, cooling the vapors from the first condensation zone in a second condensation zone to a temperature 30° to 80° C. below the temperature in the first condensation zone, but not below the dewpoint of water vapor at the prevailing pressure and not below 53° C., thereby condensing the bulk of the maleic anhydride, but not the water, contained therein, possibly together with a small amount of maleic acid, returning this condensate to the boiling maleic anhydride, and condensing the water vapor and uncondensed maleic anhydride leaving the second condensation zone.

The maleic anhydride obtained by this process in the first condensation zone has a purity such as hitherto could only be achieved by repeated distillation. It is 99.7 to 99.8% pure and is free from fumaric acid.

One embodiment of the process of the invention will now be described with reference to the accompanying schematic drawing. Maleic acid or a mixture of maleic acid with water, which may be an aqueous solution or suspension containing at least 50% by weight of maleic acid is passed from a vessel 1 into a vaporizer 2. Vaporizer 2 contains boiling maleic anhydride. The boiling temperature is maintained between 110° and 200° C. by setting up a pressure of between 50 and 760 mm. Hg. It is preferred to use a temperature of 115° to 140° C. and a pressure of 90 to 150 mm. Hg. In vaporizer 2, any water that may have been introduced is vaporized and the maleic acid is dehydrated to maleic anhydride. It is expedient to place such an amount of maleic anhydride in vaporizer 2 that the mixture remains homogeneously liquid. Advantageously, 70 to 95% by weight of the contents of vaporizer 2 should therefore be maleic anhydride. Consequently, the maleic acid or aqueous solution thereof is introduced into 2.3 to 17 times its weight of maleic anhydride. The vapors containing maleic anhydride and water vapor are advantageously passed through a column 3 maintained at the same temperature as vaporizer 2 into a first condensation zone 4. In the first condensation zone 4, the vapors are cooled by only a few degrees, advantageously by only 5° to 20° C. below the boiling temperature of the mixture in vaporizer 2, but not to below 100° C. During this operation, part of the maleic anhydride (approximately 15 to 35%) contained in the vapors condenses in practically pure form and is withdrawn via a vessel 5. The vapors which leave dephlegmator 4 and which contain water vapor and maleic anhydride in the ratio determined by the partial pressures at the temperature prevailing in the first condensation zone, are cooled in a second zone 6 to such a temperature that the bulk of the maleic anhydride is separated in liquid form, whereas the water vapor remains substantially uncondensed, i.e., the vapors are cooled to a temperature 30° to 80° C. below the condensation temperature in the first zone. This temperature to which the vapors are cooled must not be below the dewpoint of water vapor at the prevailing pressure and concentration of water vapor and not below 53° C., i.e. above the solidifying point of maleic anhydride (52.6° C.). The maleic anhydride obtained in the second condensation zone contains maleic acid and is returned to vaporizer 2 either direct or through pipe 7 and the short intermediate column 3. The ratio between maleic anhydride condensed in the first zone and maleic anhydride condensed in the second zone and then returned is between about 1:6 and 1:1.5.

In the second condensation zone 6, maleic anhydride remains vaporous to an extent which depends on the vapor pressure at the prevailing temperature. It must therefore be taken into account that the flowing water vapor carries maleic anhydride through the condensation zone. The vapors leaving the second condensation zone 6 consist substantially of water vapor and a small amount of maleic anhydride, and are condensed completely at 8. The condensate, mainly water and a small amount (approximately 10 to 25%) of maleic acid, is collected in a vessel 9. It may be used, for example, for washing maleic anhydride containing gases from the combustion of benzene, and may then be used again for the production of maleic anhydride. The fumaric acid which, in the course of time, collects in vaporizer 2 must be removed periodically. The amount of fumaric acid formed is less than 2% with reference to the amount of maleic acid used as starting material.

Since only part of the maleic anhydride is condensed in the first condensation zone and the balance is returned from the second condensation zone, the reflux ratio, i.e., the ratio between condensate of the second zone and condensate of the first zone, is thus determined. The reflux ratio is most simply controlled through the operating temperatures in the first and second condensation zones. Depending on the difference between the temperature of the vaporizing mixture and the temperature in the first condensation zone, a greater or lesser amount of maleic anhydride is condensed in the first condensation zone, so that, accordingly, a lesser or greater amount is supplied to the second condensation zone, condensed therein and returned as reflux. It is advantageous to correlate this temperature difference between the first and second condensation zones and to adjust the maleic acid feed in such a manner that 70 to 95% by weight of the contents of the vaporizer is maleic anhydride. The temperatures to be maintained in the two condensation zones depend on the operating pressure and also on the ratio of water vapor to maleic anhydride in the vapor phase.

The advantages of the process according to this invention are to be seen in the fact that maleic anhydride suitable for direct use for the production of polyesters is obtained in continuous operation without the use of an auxiliary liquid, whereas in all known methods it is necessary to subject the maleic anhydride to a separate distilling operation or at least to filter off fumaric acid from the melt.

The invention will be further illustrated by the following examples with reference to the accompanying schematic drawing, but is not limited thereby. The parts specified in the examples are parts by weight.

*Example 1*

600 parts per hour of a warm 73% aqueous maleic acid solution is passed from vessel 1 into still 2 in which 200 parts of maleic anhydride is heated at a vigorous boil at 83 mm. Hg. The maleic acid solution is preferably introduced beneath the surface of the boiling anhydride. A boiling temperature of 128° to 130° C. sets up in the still. After passing through a small column 3, the vapor mixture enters, at a temperature of about 120° C., into dephlegmator 4 in which the vapors are cooled to 115° C. About 20% of the maleic anhydride separates and flows into receiver 5. The uncondensed vapors are separated in dephlegmator 6 (maintained at 55° C.) into water vapor, which after condensation in condenser 8 collects as maleic acid containing water in receiver 9, and into maleic anhydride which flows back as a reflux through pipe 7 (designed as a siphon) and column 3 into still 2. 320 parts per hour of maleic anhydride, pure white and free from fumaric acid, is obtained in receiver 5. The product solidifies at 52.5° C. Moreover, 220 parts per hour of water condenses in condenser 8. This water contains 50 parts of maleic acid. 1200 parts per hour of maleic anhydride is returned through pipe 7. 7 parts per hour (1.6%) of fumaric acid is formed in still 2, so that the conversion is 86.5%, and the yield is 98% of the theory with reference to maleic acid reacted.

*Example 2*

In the manner described in Example 1 and in the same equipment, 400 parts per hour of a warm 70% aqueous maleic acid solution is introduced, at normal pressure, into 200 parts of boiling maleic anhydride, a boiling temperature of 190° to 195° C. being set up. The vapors are cooled to 185° C. in dephlegmator 4, and dephlegmator 6 is maintained at 108° C. The ratio between maleic anhydride condensed in dephlegmator 4 and maleic anhydride condensed in dephlegmator 6 and then returned is 1:1.5.

218 parts of maleic anhydride having a melting point of 52.4° C., 160 parts of water containing 1.35 parts of maleic acid and 5.6 parts (2%) of fumaric acid are obtained per hour. The conversion is 92%, and the yield is 97% with reference to maleic acid reacted.

*Example 3*

Using the same equipment as described in Example 1, 600 parts per hour of dry maleic acid is introduced, at 75 mm. Hg, into 200 parts of boiling maleic anhydride by means of a screw conveyor. The vapors leaving still 2 pass through column 3 into dephlegmator 4, which is maintained at 110° C. 471 parts per hours of maleic anhydride, melting at 52.5° C., is separated by condensation and collects in receiver 5. The uncondensed vapors are separated in dephlegmator 6 at 53° C. into 550 parts per hour of maleic anhydride, which is obtained as condensate and flows back through pipe 7 to still 2, and into water vapor which after condensation is obtained in receiver 9 in an amount of 121 parts per hour in the form of water containing 30 parts of maleic acid. 6 parts per hour (1%) of fumaric acid is formed in still 2. The conversion is 93%, and the yield is 98% of the theory with reference to maleic acid reacted.

What we claim is:

1. A process for the production of pure maleic anhydride from maleic acid which comprises introducing maleic acid into 2.3 to 17 times its weight of maleic anhydride boiling under a pressure of 50 to 760 mm. Hg, vaporizing maleic anhydride and water, cooling the vapors containing maleic anhydride and water vapor and having a temperature of between 110° and 200° C. at the pressure prevailing in the vaporization zone in a first condensation zone by 5° to 20° C., but not to below 100° C., withdrawing the condensing maleic anhydride, cooling the vapors coming from said first condensation zone in a second condensation zone to a temperature 30° to 80° C. below the temperature prevailing in said first condensation zone, but not below the dewpoint of water vapor at the prevailing pressure and not below 53° C., and correlating the temperature difference between the first condensation zone and the second condensation zone that the ratio of maleic anhydride condensed in the first zone to the maleic anhydride condensed in the second zone is between about 1:6 and 1:1.5, returning the condensate obtained in said second condensation zone into said boiling maleic anhydride, and condensing the water vapor and uncondensed maleic anhydride leaving said second condensation zone.

2. A process for the production of pure maleic anhydride from maleic acid which comprises introducing a mixture of maleic acid and water containing at least 50% by weight of maleic acid into 2.3 to 17 times its weight of maleic anhydride boiling under a pressure of 50 to 760 mm. Hg, vaporizing maleic anhydride and water, cooling the vapors containing maleic anhydride and water vapor and having a temperature of between 110° and 200° C. at the pressure prevailing in the vaporization zone in a first condensation zone by 5° to 20° C., but not to below 100° C., withdrawing the condensing maleic anhydride, cooling the vapors coming from said first condensation zone in a second condensation zone to a temperature 30° to 80° C. below the temperature prevailing in said first condensation zone, but not below the dewpoint of water vapor at the prevailing pressure and not below 53° C., and correlating the temperature difference between the first condensation zone and the second condensation zone that the ratio of maleic anhydride condensed in the first zone to the maleic anhydride condensed in the second zone is between about 1:6 and 1:1.5, returning the condensate obtained in said second condensation zone into said boiling maleic anhydride, and condensing the water vapor and uncondensed maleic anhydride leaving said second condensation zone.

3. A process for the production of pure maleic anhydride from maleic acid which comprises introducing maleic acid into 2.3 to 17 times tis weight of maleic anhydride boiling under a pressure of 90 to 150 mm. Hg, vaporizing maleic anhydride and water, cooling the vapors containing maleic anhydride and water vapor and having a temperature of between 115° to 140° C. at the pressure prevailing in the vaporization zone in a first condensation zone by 5° to 20° C., but not to below 100° C., withdrawing the condensing maleic anhydride, cooling the vapors coming from said first condensation zone at the pressure prevailing in the vaporization zone in a second condensation zone to a temperature 30° to 80° C. below the temperature prevailing in said first condensation zone, but not below the dewpoint of water vapor at the prevailing pressure and not below 53° C. and correlating the temperature difference between the first condensation zone and the second condensation zone that the ratio of maleic anhydride condensed in the first to the maleic anhydride condensed in the second zone is between about 1:6 and 1:1.5, returning the condensate obtained in said second condensation zone into said boiling maleic anhydride, and condensing the water vapor and uncondensed maleic anhydride leaving said second condensation zone.

4. A process for the production of pure maleic anhydride from maleic acid which comprises introducing a mixture of maleic acid and water containing at least 50% by weight of maleic acid into 2.3 to 17 times its weight of maleic anhydride boiling under a pressure of 90 to 150 mm. Hg, vaporizing maleic anhydride and water, cooling the vapors containing maleic anhydride and water vapor and having a temperature of between 115° to 140° C. at the pressure prevailing in the vaporization zone in a first condensation zone by 5° to 20° C., but not to below 100° C., withdrawing the condensing maleic anhydride, cooling the vapors coming from said first condensation zone at the pressure prevailing in the vaporization zone in a second condensation zone to a temperature 30° to 80° C. below the temperature prevailing in said first condensation zone, but not below the dewpoint of water vapor at the prevailing pressure and not below 53° C. and correlating the temperature difference between the first condensation zone and the second condensation zone that the ratio of maleic anhydride condensed in the first to the maleic anhydride condensed in the second zone is between about 1:6 and 1:1.5, returning the condensate obtained in said second condensation zone into said boiling maleic anhydride, and condensing the water vapor and uncondensed maleic anhydride leaving said second condensation zone.

References Cited in the file of this patent
UNITED STATES PATENTS

| | | |
|---|---|---|
| 2,205,402 | Foster et al. | June 25, 1940 |
| 2,222,283 | Crowell | Nov. 19, 1940 |
| 2,696,489 | Adams et al. | Dec. 7, 1954 |